350-96.1 SR
XR 3,859,536

Thiel 3,859,536
Jan. 7, 1975

[54] OPTICAL COMMUNIC... SOURCE-DETECTOR PAIR

[75] Inventor: Frank L. Thiel, Painted Post, N.Y.

[73] Assignee: Corning Glass Works, Corning, N.Y.

[22] Filed: Jan. 7, 1974

[21] Appl. No.: 431,042

[52] U.S. Cl. .................. 250/552, 250/227, 250/551
[51] Int. Cl. .......................... G02b 5/14, G02f 1/28
[58] Field of Search .................... 250/551, 552, 227

[56] References Cited

UNITED STATES PATENTS

| | | | |
|---|---|---|---|
| 3,051,035 | 8/1962 | Root | 250/227 X |
| 3,512,027 | 5/1970 | Kupsky | 250/552 X |
| 3,774,039 | 11/1973 | Price | 250/552 |

FOREIGN PATENTS OR APPLICATIONS

| | | | |
|---|---|---|---|
| 1,199,205 | 8/1965 | Germany | 250/227 |

OTHER PUBLICATIONS

Michelitsch, M., "Light Emitting Gallium Arsenide Diode" IBM Tech. Disclosure Bull., Vol. 8, No. 1, June 1965, pg. 191.

*Primary Examiner*—Archie R. Borchelt
*Assistant Examiner*—T. N. Grigsby
*Attorney, Agent, or Firm*—William J. Simmons, Jr.; Clarence R. Patty, Jr.

[57] ABSTRACT

A source-detector pair for injecting optical signals into the endface of an optical waveguide bundle and extracting and detecting optical signals emanating from the bundle endface. An optical detector is axially aligned with the waveguide bundle and is separated therefrom by an optical mixer rod. An edge-emitting solid state source is disposed on that side of the detector opposite the mixer rod. Light radiating from the bundle endface is propagated through the mixer rod and impinges upon the detector. Light emitted from the periphery of the source is reflected and propagates past the detector to the mixer rod from which it emerges and illuminates in a relatively uniform fashion the optical waveguide bundle endface.

10 Claims, 2 Drawing Figures

3859536
OR IN 250/552

OPTICAL COMMUNICATION SYSTEM SOURCE-DETECTOR PAIR

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz. The transmitting media required in the transmission of frequencies around $10^{15}$ Hz, which are referred to as optical signal transmission lines, may consist of a single optical waveguide or a bundle thereof. Present low loss optical waveguides consist of an optical fiber having a transparent core surrounded by a layer of transparent cladding material having a refractive index which is lower than that of the core.

To establish an optical communication network between a plurality of stations, a variety of interconnections schemes may be utilized. Each station can be "hard wired" to each of the remaining stations, or networks such as loop and line data buses may be employed. Regardless of the type of interconnection scheme that is employed, a part thereof usually includes an otpical waveguide bundle in which information transmission occurs in two directions. The point of termination of this bundle at a station must include means for initiating the propagation of light wave energy in the bundle and means for detecting that light wave energy which radiates from the bundle. The light detector and light emitter are often remotely disposed with respect to one another and must be optically connected to the bundle endface by such optical components as prisms, mixers, additional waveguide bundles and the like.

SUMMARY OF THE INVENTION

It is therefore an object of the present invention to provide a single compact device for disposition at the endface of an optical waveguide bundle for injecting optical wave energy into the bundle and extracting and detecting energy propagating therein.

The present invention generally pertains to optical communication systems of the type comprising an optical waveguide bundle for bidirectionally propagating optical signals. The present invention, which relates to an optical waveguide bundle termination device for use in such systems, comprises the following elements which are disposed in axial alignment with an end portion of the bundle. Optical mixer means having first and second opposed endfaces is disposed adjacent to the bundle endface, the mixer means being characterized in that light received at any point on either endface is distributed across the opposite endface. A solid state light detector is disposed adjacent to the second endface of the mixer means. An edge-emitting solid state light source is disposed on that side of the detector opposite the mixer means. Means is disposed in light receiving relationship with respect to the light source for reflecting light emitted from the source toward the second endface of the mixer means.

DESCRIPTION OF THE PREFERRED EMBODIMENT

Figure 1:
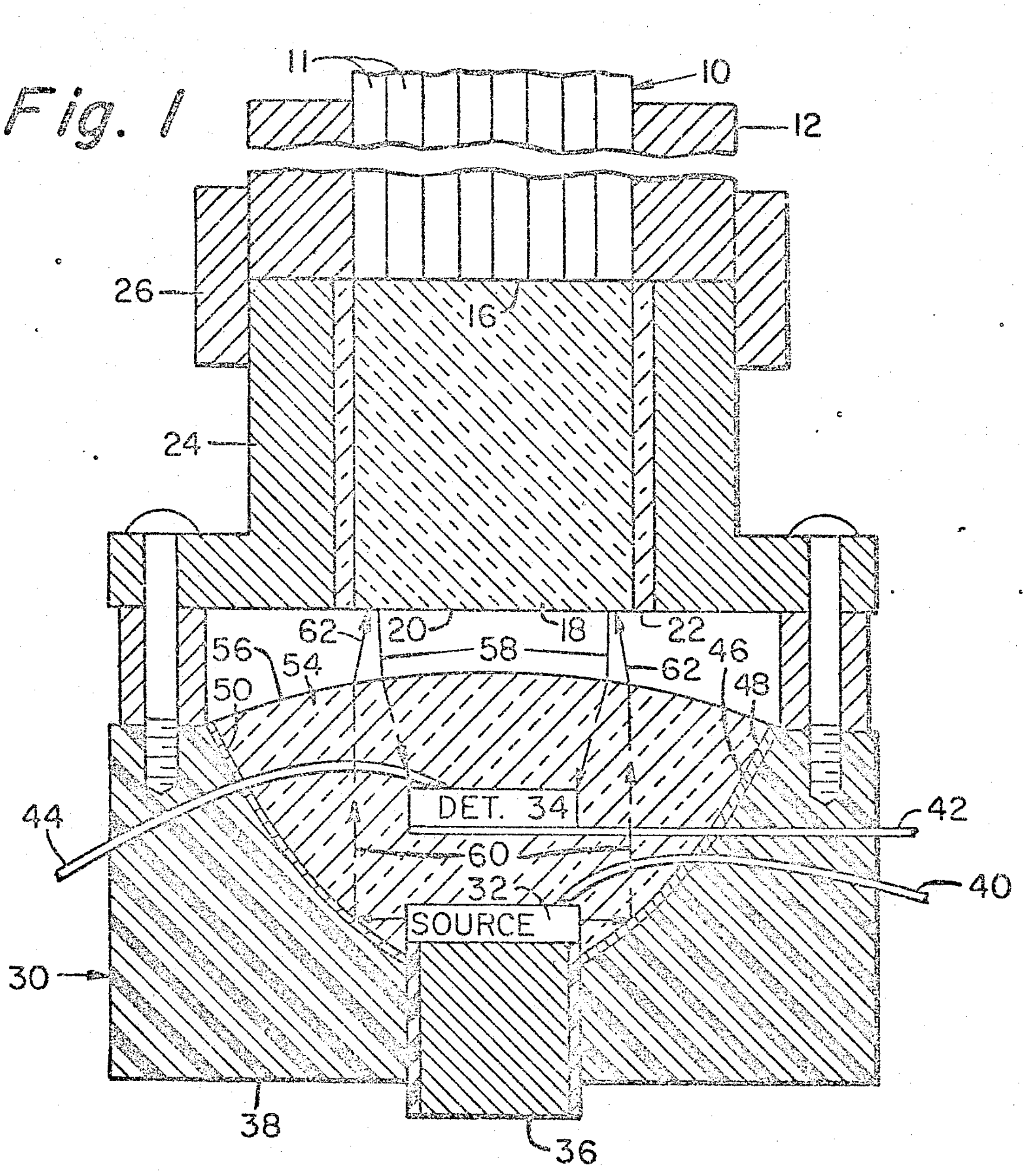
FIG. 1 is a cross-sectional view of an optical waveguide bundle termination device.

FIG. 1 is a cross-sectional view of an optical waveguide bundle termination device constructed in accordance with the present invention. It is to be noted that the drawing is not to scale and merely serves to illustrate the present invention. The end portion of a bundle 10 of optical waveguide 11 is disposed in a termination ferrule 12 which maintains the end portions of waveguides 11 in parallel alignment. The ends of the optical waveguides and the ferrule are ground and polished so that each waveguide terminates in an endface that is substantially perpendicular to the axis thereof, and all of the waveguide endfaces lie in a single plane and form the bundle endface. Ferrule 12 preferably consists of a material such as glass, brass or the like which has grinding characteristics similar to those of the waveguide material.

The endface of bundle 10 is disposed adjacent to a first endface 16 of an elongated transparent mixer rod 18. A second endface 20 is located opposite endface 16, and both endfaces are preferably perpendicular to the longitudinal axis of rod 18. Rod 18 is preferably in the shape of a cylinder of circular cross-section, but other suitable cross-sectional shapes may be employed. The outer surface of rod 18 cooperates with the surrounding medium to provide an optical quality interface for reflecting back into the rod any light that is incident thereon. Such an interface is preferably provided by layer 22 of transparent cladding material having a refractive index sufficiently lower than that of rod 18. As used herein, the term "transparent" indicates transparency to those wavelengths of light that are to be transmitted by optical waveguides 11. Mixer rod 18 is disposed in a flanged support member 24 which is secured to ferrule 12 by connecting means 26.

A light source-detector pair 30 including solid state source 32 and solid state detector 34, is disposed adjacent to endface 20. The light source is an edge-emitting diode, preferably a type such as a double-heterojunction, large optical cavity (LOC) laser diode. The LOC laser diode is fabricated such that the light generated therein is "waveguided" and must emerge parallel to the plane of the junction, rather than normal to the junction through the planar top and bottom surfaces. Edge-emitting laser diodes can be operated continuously at room temperature at currents below the lasing threshold current as incoherent emitters, i.e., as LED's while preserving the feature of edge emission. Two commercially available edge-emitting diodes are the RCA model C30034 LOC laser diode and the Spectronics model SE-2430 edge-emitting LED. Diode source 32 is provided with a large electrical contact 36 which also serves as a heat sink. Contact 36 is supported by housing 38. The remaining electrical connection to diode source 32 is provided by flying lead 40.

The light detector 34 may be a conventional p-i-n or avalanche photodiode. Some commercially available diodes suitable for use as detector 34 are the EG&G model SGD-040A PIN diode and the Texas Instruments model TIXL-59 avalanche diode. Electrical connection is made to detector 34 through beam lead 42 and flying lead 44. Beam lead 42 is also employed to initially support detector 34 during the manufacture of source-detector pair 30.

An edge-emitting diode source is employed since detector 34 is disposed between the source and mixer 18. The interior surface of housing 38 is therefore provided with a reflective surface 48 to reflect light emitted by source 32 toward rod 18. Because of the low numerical aperture of presently available low loss optical waveguides, surface 48 should reflect light from source 32 to form a beam that is as nearly collimated as possible. Light reflecting surface 48, which is illustrated as being parabolic, may be formed by depositing a thin layer 50 of light-reflecting material such as silver, chromium or the like upon the cavity forming inner surface 46 of housing 38. Alternatively, housing 38 could consist of a material, the surface of which could be polished to form light-reflecting surface 48. Obviously, the various metallic leads and electrical contacts to source 32 and detector 34 must not contact metallic members such as reflecting layer 50, and all electrical contacts and leads are therefore suitably insulated.

Detector 34 is held rigidly in place by filling the cavity within housing 38 with a suitable transparent adhesive 54. Such adhesives include silicon fluid, ethylcyanoacrylate epoxy, methyl siloxane, and the like. Many suitable adhesives are described in a compilation distributed by National Technical Information Service entitled "Properties of Optically Transparent Adhesives" by W. H. Veazie, June 1972, publication No. EP-IC-IR-76 (revised).

Light propagating in optical waveguides 11 radiates therefrom into mixer rod 18. As illustrated by dashed lines 58 this light emanates from mixer rod 18 and impinges upon detector 34. If the surface 56 of adhesive 54 is formed in the shape of a lens, light represented by lines 58 is focused onto the surface of detector 34, the area of which is less than that of mixer endface 20. Light is preferably radiated radially in all directions from source 32 which is disposed at the focus of the parabolic reflecting surface 48. After reflecting from surface 48, this cylindrical "shell" of light represented by dashed lines 60 is directed toward endface 20 of mixer rod 18. If surface 56 is lens-shaped, the reflected source light is focused toward the system axis as indicated by lines 62. This is especially desirable when the dimensions of the detector and source are almost as large as endface 20, in which case it is necessary to focus light emitted from the source so that it can impinge upon endface 20.

Figure 2:
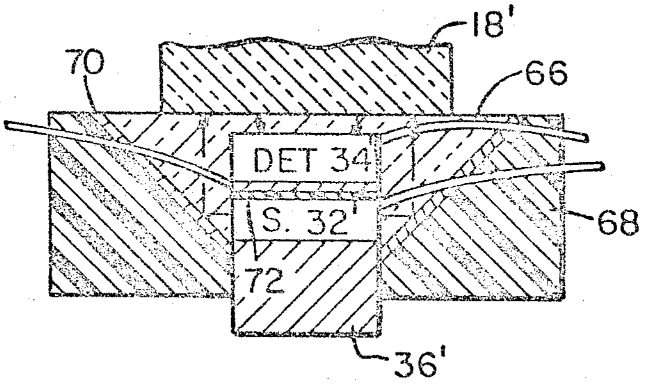
FIG. 2 is a cross-sectional view of a further embodiment of the present invention.

In the embodiment of FIG. 2, wherein elements similar to those of FIG. 1 are represented by primed reference numerals, the surface of transparent adhesive 66 is flat. The interior surface of housing 68 is provided with a conically shaped layer 70 of light-reflecting material. In this embodiment the source-detector pair is monolithically formed by disposing detector 34′ directly upon an insulating layer 72 which covers the surface of source 32′. Such a monolithic structure could also be formed by growing additional epitaxial layers on the surface of the source diode. Since detector 34′ is supported by source 32′, transparent adhesive material 66 could be omitted. In this case, mixer rod 18′ could be disposed directly upon the surface of detector 34′.

I claim:

1. In an optical communication system of the type comprising an optical waveguide bundle for bidirectionally propagating optical signals, a bundle termination device comprising, in axial alignment with an end portion of said bundle, optical mixer means having first and second opposed endfaces, said mixer means being characterized in that light received at any point on either endface thereof is distributed across the opposite endface, said first mixer endface being disposed adjacent to the endface of said end portion of said bundle, a solid state light detector disposed adjacent to said second endface of said mixer means, an edge-emitting solid state light source disposed on that side of said detector opposite said mixer means, and means disposed in light receiving relationship with respect to said source for reflecting light emitted from said source toward said second endface of said mixer means.

2. A system in accordance with claim 1 further comprising light focusing means disposed between said detector and said second endface of said mixer.

3. A system in accordance with claim 1 further comprising a housing having a wall forming a cavity therein, said source and said detector being potted in said cavity by a transparent adhesive, said light reflecting means being disposed on the cavity forming wall of said housing.

4. A system in accordance with claim 3 wherein the surface of said adhesive which faces said second endface of said mixing means is curved to focus light reflecting from said reflector onto said second mixer endface.

5. A system in accordance with claim 4 wherein said curved surface of said adhesive is spaced from said second mixer endface.

6. A system in accordance with claim 5 wherein said detector is spaced from said source.

7. A system in accordance with claim 6 wherein the cavity forming wall of said housing is parabolically shaped.

8. A system in accordance with claim 5 wherein said detector is disposed upon a surface of said source.

9. A system in accordance with claim 3 wherein the area of the surface of said detector facing said mixer means is smaller than that of the second endface of said mixer means, said second endface of said mixer means being in contact with said adhesive.

10. A system in accordance with claim 9 wherein the surface of said adhesive which contacts said mixer means is flat.

* * * * *